US008609038B2

(12) United States Patent
Kim et al.

(10) Patent No.: US 8,609,038 B2
(45) Date of Patent: Dec. 17, 2013

(54) CENTRIFUGAL FORCE-BASED MICROFLUIDIC DEVICE AND METHOD OF FABRICATING THE SAME

(75) Inventors: Chung-ung Kim, Yongin-si (KR); Ki-ju Lee, Suwon-si (KR); Jong-jin Park, Yonging-si (KR); Dong-hwi Cho, Suwon-si (KR); Su-bong Bae, Suwon-si (KR); Jong-cheol Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 314 days.

(21) Appl. No.: 12/708,021

(22) Filed: Feb. 18, 2010

(65) Prior Publication Data

US 2010/0233798 A1 Sep. 16, 2010

(30) Foreign Application Priority Data

Mar. 12, 2009 (KR) ........................ 10-2009-0021003

(51) Int. Cl.
*G01N 15/06* (2006.01)

(52) U.S. Cl.
USPC ............ 422/503; 422/50; 422/68.1; 422/502; 422/504; 422/506; 422/509; 422/511; 422/512; 422/514; 422/521; 436/43; 436/180

(58) Field of Classification Search
USPC .......... 422/50, 68.1, 502, 503, 504, 506, 509, 422/511, 512, 514, 521
See application file for complete search history.

(56) References Cited

U.S. PATENT DOCUMENTS

| | | | | |
|---|---|---|---|---|
| 2001/0001060 | A1 * | 5/2001 | Kellogg et al. | 435/7.1 |
| 2005/0221281 | A1 | 10/2005 | Ho | |
| 2006/0023208 | A1 | 2/2006 | Murakami et al. | |

FOREIGN PATENT DOCUMENTS

| | | | |
|---|---|---|---|
| EP | 1 889 661 | A1 | 2/2008 |
| JP | 2001-124690 | | 5/2001 |
| JP | 2003-215133 | | 7/2003 |
| JP | 2003-254896 | | 9/2003 |
| JP | 2006-349347 | | 12/2006 |
| WO | 2008/080046 | A1 | 4/2008 |

OTHER PUBLICATIONS

European Search Report dated May 12, 2010 and issued in corresponding European Patent Application 10155110.9.

* cited by examiner

*Primary Examiner* — Brian J Sines
(74) *Attorney, Agent, or Firm* — Staas & Halsey LLP

(57) ABSTRACT

Provided are a centrifugal force-based microfluidic device, in which biochemical treatments of samples are executed, and a method of fabricating the centrifugal force-based microfluidic device. The centrifugal force-based microfluidic device is mountable on a rotatable device and includes: a disk-shaped portion; and an inlet hole defined within, configured to receive fluid from outside the centrifugal force-based microfluidic device having a first opening with a first inner diameter, and a second opening disposed on the first opening having a second inner diameter greater than the first inner diameter, and a depth of the second opening greater than a height of a fluid droplet formable in the second opening.

7 Claims, 8 Drawing Sheets

CENTRIFUGAL FORCE-BASED MICROFLUIDIC DEVICE AND METHOD OF FABRICATING THE SAME

CROSS-REFERENCE TO RELATED APPLICATIONS

This application claims the benefit of Korean Patent Application No. 10-2009-0021003, filed on Mar. 12, 2009, in the Korean Intellectual Property Office, the disclosure of which is incorporated herein in its entirety by reference.

BACKGROUND

Field

The embodiment relates to a centrifugal force-based microfluidic device, in particular to a centrifugal force-based microfluidic device in which biochemical treatments of samples are executed, and a method of fabricating the centrifugal force-based microfluidic device.

Microfluidic devices include a micro channel, a chamber, and a reaction region therein to perform biochemical treatments such as culturing, mixing, separating, and enriching of samples after injecting a small amount of bio sample into the microfluidic devices. Microfluidic devices using centrifugal force as a driving force to convey samples or fluid are referred to as centrifugal force-based microfluidic devices. Biochemical treatments, which were mainly executed in laboratories, may be performed easily by using centrifugal force-based microfluidic devices. Centrifugal force-based microfluidic devices are typically formed as disk shapes, which is why centrifugal force-based microfluidic devices are also referred to as lab-on-a-disk or lab-on-a-CD.

Bio samples are injected through an inlet hole formed in the microfluidic device by using an injection unit such as a pipette or a syringe. However, when the bio samples are injected through the inlet hole, a peripheral portion of the inlet hole may be stained with the bio samples. When the microfluidic device is loaded in a biochemical treatment apparatus and rotated, the bio samples stained around the inlet hole may be scattered in the biochemical treatment apparatus, and accordingly, the biochemical treatment apparatus may be contaminated.

SUMMARY

Aspects and/or advantages will be set forth in part in the description which follows and, in part, will be apparent from the description, or may be learned by practicing the disclosure.

The disclosure discusses a centrifugal force-based microfluidic device which prevents bio samples from being dispersed even with rotation of the microfluidic device, and a method of fabricating the centrifugal force-based microfluidic device.

Accordingly, one embodiment, provides a centrifugal force-based microfluidic device including: a disk-shaped portion; and an inlet hole defined within, configured to receive fluid from outside the centrifugal force-based microfluidic device. The inlet hole may have a first opening with a first inner diameter, and a second opening disposed on the first opening having a second inner diameter greater than the first inner diameter. The depth of the second opening may be greater than a height of a fluid droplet formable in the second opening.

The centrifugal force-based microfluidic device may further include a unit to perform biochemical treatment of samples including a channel or a chamber which may connect to the disk-shaped portion of the microfluidic through the inlet hole.

The centrifugal force-based microfluidic device may further include an intermediate layer disposed between the first opening and the second opening, which can be broken or pierced by a tool used to inject fluid into the centrifugal force-based microfluidic device.

The centrifugal force-based microfluidic device may further include a mounting hole into which a unit to rotate the centrifugal force-based microfluidic device may be inserted. Another embodiment of the centrifugal force-based microfluidic device may include three or more disk-shaped members having a body portion and a cover stacked on the body portion; and a film disposed between the body portion and the cover to form an intermediate layer. The disk-shaped members may further include a unit to perform biochemical treatment of samples having an inlet hole defined within, configured to receive fluid from outside the centrifugal force-based microfluidic device.

The body portion may be made of plates bonded together having channel grooves to form a channel or chamber for fluid samples. Furthermore, the body portion may include a first opening defined within the body, having a first diameter. The first opening may lead to the channel or chamber to allow fluid to move therethrough.

The cover may include a second opening defined within the body, having a second inner diameter greater than that of the first opening. The second opening may be located at a position where a circumference of the first opening does not exceed a circumference of the second opening. The depth of the second opening may be greater than a height of a fluid droplet which may be formed in the second opening.

Yet another embodiment provides, a method of fabricating a centrifugal force-based microfluidic device, the method including: preparing a body including a chamber to receive fluid or a channel to provide a flow path of the fluid, and a first opening connected to the chamber or the channel having a first inner diameter; preparing a cover including a second opening having a second inner diameter greater than the first inner diameter; and fixing the cover on the body in an arrangement such that a circumference of the first opening does not exceed a circumference of the second opening, and a depth of the second opening is greater than a height of a fluid droplet formable in the second opening.

The method may further include preparing an intermediate layer which is disposed between the first and second openings and broken or pierced by a tool used to inject fluid into the centrifugal force-based microfluidic device.

The forming of the intermediate layer may include: using an adhesive to attach one surface of a film having both upper and lower surfaces onto an upper surface of the body or a lower surface of the cover before fixing the cover onto the body; and removing excess adhesive after fixing the cover onto the body.

Removing excess adhesive includes placing the film in air so that the adhesive applied to a portion of the film may be vaporized or hardened when exposed to the air.

Fixing the cover further comprises attaching the opposite surface of the film which remains unattached to either the upper surface of the body or the lower surface of the cover.

BRIEF DESCRIPTION OF THE DRAWINGS

Exemplary embodiments will be more clearly understood from the following detailed description taken in conjunction with the accompanying drawings in which.

DETAILED DESCRIPTION OF EMBODIMENTS

Figure 1:
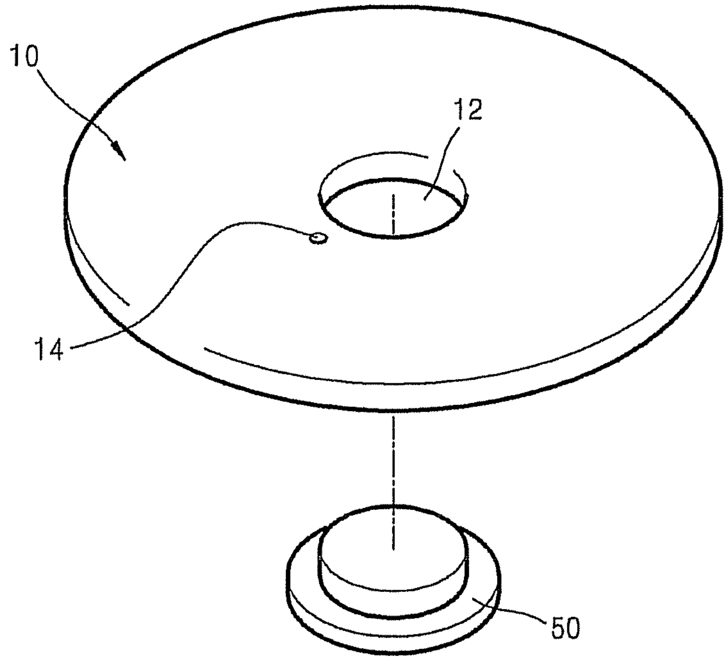
FIG. 1 is a perspective view of a centrifugal force-based microfluidic device according to an embodiment.

Reference will now be made in detail to the embodiments, examples of which are illustrated in the accompanying drawings, wherein like reference numerals refer to the like elements throughout. The embodiments are described below to explain the disclosure by referring to the figures.

Hereinafter, a centrifugal force-based microfluidic device and a method of fabricating the centrifugal force-based microfluidic device according to embodiments will be described with reference to accompanying drawings.

Figure 2A:
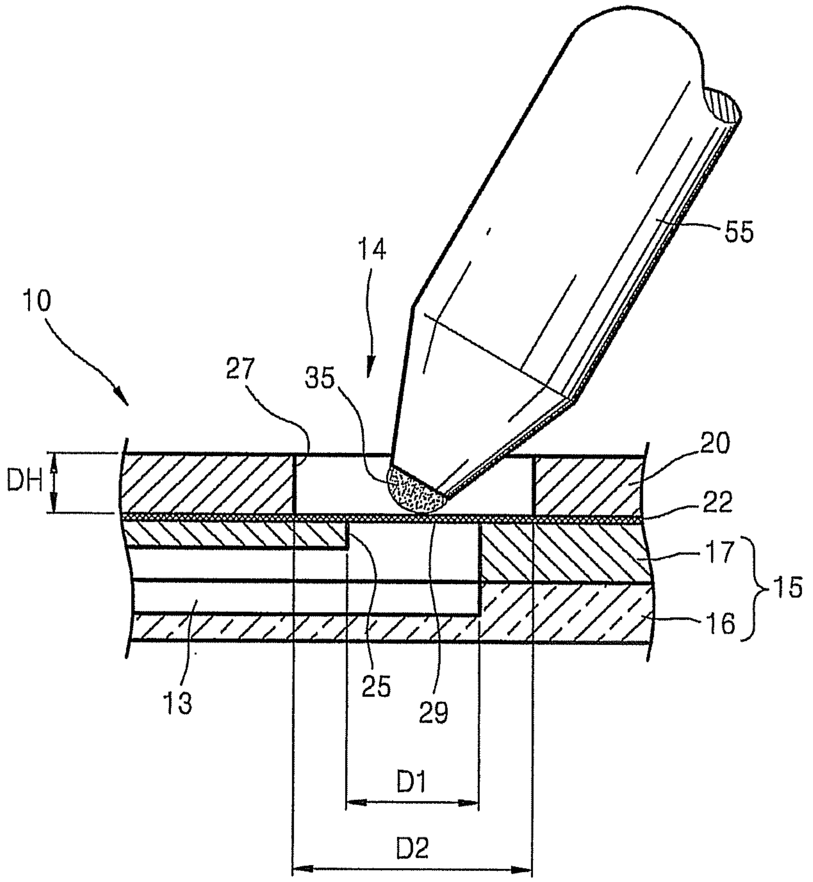
FIGS. 2A through 2C are cross-sectional views of an inlet hole of the microfluidic device illustrated in FIG. 1, and sequentially illustrating processes of injecting bio samples into the microfluidic device through the inlet hole according to various embodiments.
Figure 2B:
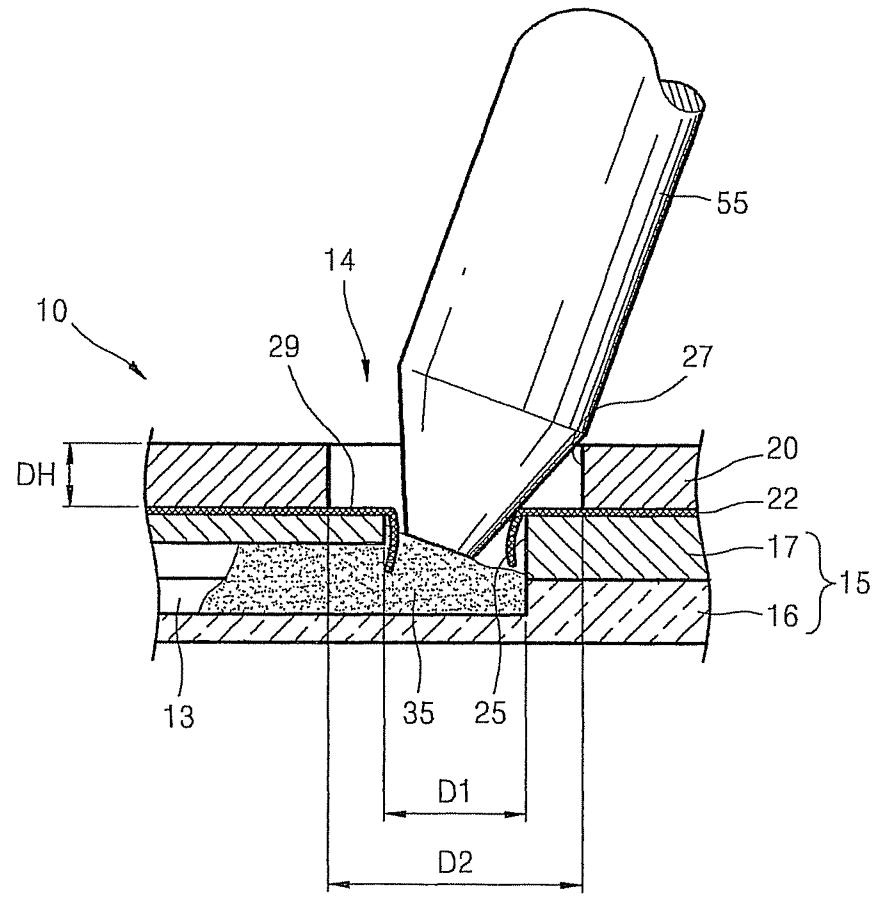
Figure 2C:
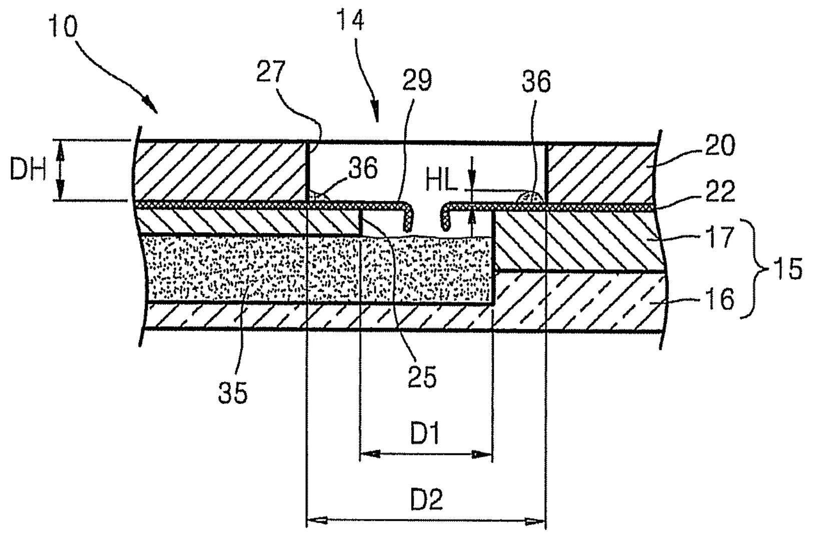

FIG. 1 is a perspective view of a centrifugal force-based microfluidic device according to one embodiment. FIGS. 2A through 2C are cross-sectional views of an inlet hole of the microfluidic device illustrated in FIG. 1, and sequentially illustrating processes of injecting bio samples into the microfluidic device through the inlet hole.

Referring to FIG. 1, the centrifugal force-based microfluidic device 10 of one embodiment is formed as a disk, and the centrifugal force-based microfluidic device 10 is mounted on a turntable 50 to be rotated with the turntable 50. The diameter of the centrifugal force-based microfluidic device 10 can be variable, for example it may be 8 cm, or 12 cm. The centrifugal force-based microfluidic device 10 has a mounting hole 12 defined within the body, where through the turntable 50 may be inserted.

The centrifugal force-based microfluidic device 10 includes a unit to perform biochemical treatment of samples. The biochemical treatment of the sample may include culturing, mixing, separating, and enriching of samples. The unit to perform biochemical treatment of samples may include an inlet hole 14 defined within the body and configured to receive therethrough, liquid, such as biochemical samples required in the biochemical treatment, is injected into the centrifugal force-based microfluidic device 10, a channel 13 (refer to FIG. 2A) to convey the liquid, a chamber (not shown) to store the liquid, a reaction region (not shown) in which biochemical reactions of the sample occur, and a valve (not shown) controlling a flow of the liquid. The inlet hole 14 of the centrifugal force-based microfluidic device 10 has an opened upper portion. The inlet hole 14 is connected to the channel 13 or the chamber (not shown).

Referring to FIG. 2A, the centrifugal force-based microfluidic device 10 includes three disk-shaped members and one film. In more detail, the centrifugal force-based microfluidic device 10 includes a body 15 formed of a first plate 16 and a second plate 17 which are bonded to each other, a cover 20 stacked on the body 15, and a film 22 disposed between the body 15 and the cover 20. The first plate 16, the second plate 17, and the cover 20 may be formed of silicon, glass, or plastic. However, it is not limited thereto.

In the body 15, the channel 13 or the chamber (not shown) is formed. In addition, the body 15 includes a first opening 25 which is connected to the channel 13 or the chamber (not shown) so that the fluid may move therethrough and has a first inner diameter D1. The cover 20 includes a second opening 27 having a second inner diameter D2 which is greater than the first inner diameter D1. The second opening 27 is located at a position where a circumference of the first opening 25 does not exceed a circumference of the second opening 27. A part of the film 22, which is disposed between the first opening 25 and the second opening 27, forms an intermediate layer 29. With respect to the second opening 27 and the cover 20, the first opening 25 is recessed and covered by the pierceable film.

Hereinafter, processes of injecting samples into the centrifugal force-based microfluidic device 10 will be described with reference to FIGS. 2A through 2C. In order to inject a fluid sample 35, such as blood, into the centrifugal force-based microfluidic device 10, a tool such as a pipette 55, is used. Referring to FIG. 2A, an end of the pipette 55, in which the sample 35 is received, approaches the second opening 27 of the inlet hole 14.

Referring to FIG. 2B, when the pipette 55 is pressed downward, the intermediate layer 29 is broken, and the end of the pipette 55 reaches through the first opening 25 after passing through the second opening 27. In this state, the sample 35 in the pipette 55 is ejected into the channel 13. Referring to FIG. 2C, after injecting the sample 35, the pipette 55 is removed from the inlet hole 14.

When the pipette 55 is removed from the inlet hole 14, the fluid sample remaining in the pipette 55 may be dropped on the second opening 27 to form a fluid droplet 36. In more detail, when the sample 35 is injected into the channel 13 by inserting the pipette 55 to the inlet hole 14 or when the pipette 55 is separated from the inlet hole 14, the end of the pipette 55 is leaned against the circumference of the first opening 25, and accordingly, the fluid droplet 36 due to the remaining sample 35 in the pipette 55 may be formed on the second opening 27 or in the recess. However, the inner diameter D2 of the second opening 27 is sufficiently large so that the end of the pipette 55 does not contact the second opening 27. Accordingly, the fluid droplet 36 would not be formed on an upper surface of the cover 20 due to the remaining sample with care of general level is used.

A depth DH of the second opening 27 corresponds to a thickness of the cover 20, and the depth DH is greater than a height HL of the droplet 36. Therefore, even when the centrifugal force-based microfluidic device 10 is rotated by rotating the turntable 50, the droplet 36 is locked in the second opening 27 and is not scattered to outside of the centrifugal force-based microfluidic device 10. Therefore, contamination of a biochemical treatment apparatus (not shown) which execute the biochemical treatments of samples by using the centrifugal force-based microfluidic device 10 may be prevented.

FIGS. 3A through 3D are cross-sectional views illustrating a method of fabricating the centrifugal force-based microfluidic device 10 illustrated in FIG. 1. The method of fabricating the centrifugal force-based microfluidic device 10 will be described in detail as follows.

Figure 3A:
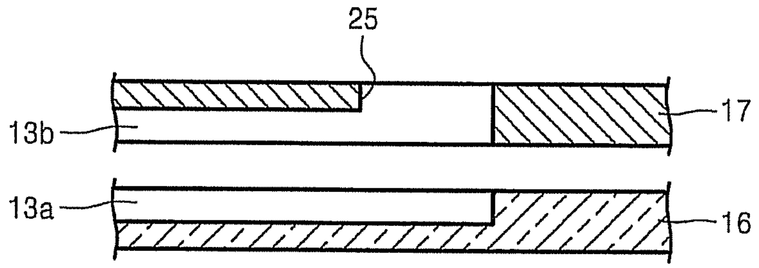
FIGS. 3A through 3D are cross-sectional views illustrating a method of fabricating the microfluidic device illustrated in FIG. 1 according to various embodiments.

Referring to FIG. 3A, the first plate 16 and the second plate 17 are prepared. Channel grooves **13*a* and 13*b* or chamber grooves (not shown) are formed on an upper surface of the first plate 16 and a lower surface of the second plate 17 so as to form the channel 13 (refer to FIG. 3B) or a chamber (not shown) by combining the first and second plates 16 and 17. In addition, the second plate 17 includes the second opening 25**.

Figure 3B:
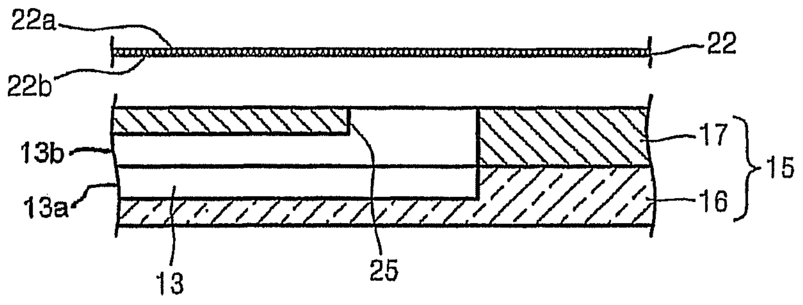

Referring to FIG. 3B, the first plate 16 and the second plate 17 are combined to form the body 15. At this time, the channel grooves **13*a* and 13*b* and the chamber grooves (not shown) are combined together to form the channel 13 and the chamber (not shown). The film 22 is attached to an upper surface of the body 15. An adhesive is applied on upper and lower surfaces 22***a* and 22*b* respectively of the film 22, and the lower surface 22*b* of the film 22 is attached to the upper surface of the body 15. Alternatively, the upper surface 22*a* of the film 22 may be first attached to the lower surface of the cover 20. The film 22 is of a type that may be broken or pierced by human force.

Figure 3C:
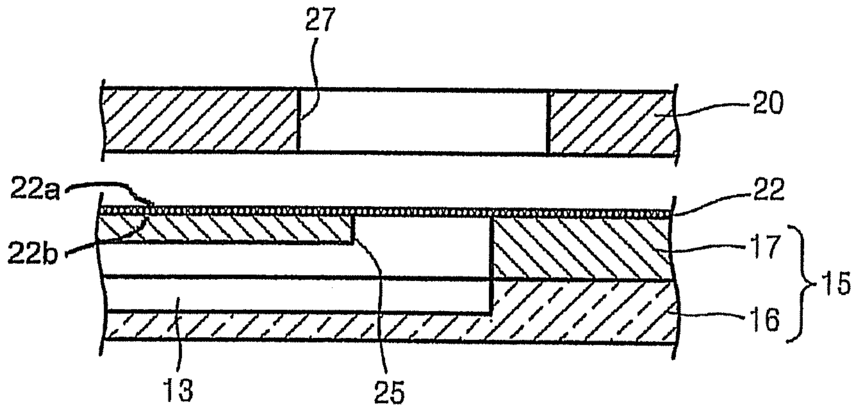

Referring to FIG. 3C, the cover 20 is attached to the upper surface 22*a* of the film 22 so as to be fixed on the body 15. When the cover 20 is fixed on the body 15, the cover 20 is arranged so that the circumference of the first opening 25 does not exceed the circumference of the second opening 27.

Figure 3D:
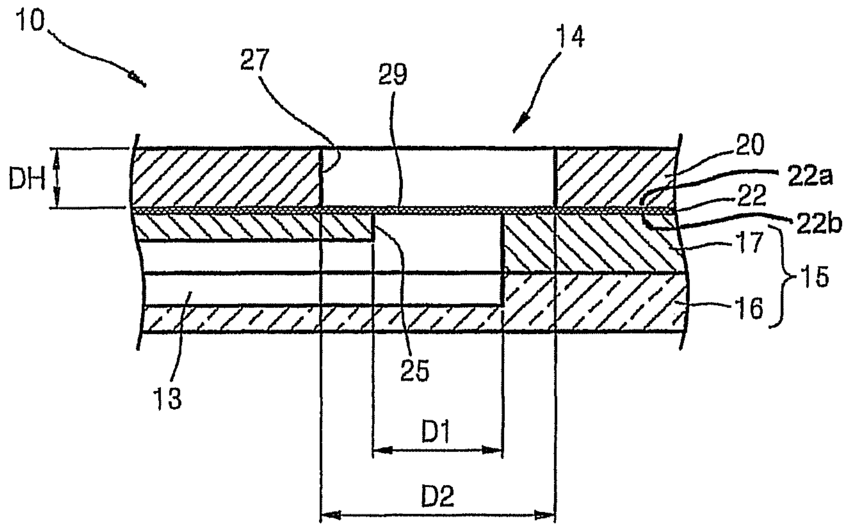

Referring to FIG. 3D, after fixing the cover 20 on the body 15, an adhesive property of a portion of the both surfaces 22*a* and 22*b* of the film, which is not attached to the body 15 or the cover 20 but exposed to the air, is removed to form the intermediate layer 29. In order to remove the adhesive property of the film 22, the film 22 may be placed in the air. That is, the adhesive applied on the film 22 may be vaporized or hardened in the air as time passes by, and accordingly, the adhesive property may be removed.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A centrifugal force-based microfluidic device, comprising:

a disk-shaped portion; and an inlet hole defined within the disk-shaped portion, configured to receive fluid from outside the centrifugal force-based microfluidic device having a first opening with a first inner diameter and a disc-shaped cover including a second opening disposed directly on the first opening having a second inner diameter greater than the first inner diameter, wherein the second opening is positioned directly on an upper portion of the disk-shaped portion relative to the first opening.

2. The centrifugal force-based microfluidic device of claim 1, further comprising a unit to perform biochemical treatment of samples including a channel or a chamber connecting to the disk-shaped portion through the inlet hole.

3. The centrifugal force-based microfluidic device of claim 1, further comprising an intermediate layer disposed between the first opening and the second opening pierceable by a tool used to inject fluid into the centrifugal force-based microfluidic device.

4. The centrifugal force-based microfluidic device of claim 1, wherein the inlet hole has an open upper portion.

5. The centrifugal force-based microfluidic device of claim 1, wherein a tool such as a pipette is used to inject fluid into the centrifugal force-based microfluidic device.

6. The centrifugal force-based microfluidic device of claim 1, wherein the disk-shaped portion further comprises a mounting hole defined within to which a unit to rotate the centrifugal force-based microfluidic device is inserted.

7. The centrifugal force-based microfluidic device of claim 6, wherein the unit to rotate the centrifugal force-based microfluidic device is a turntable.

* * * * *